(12) United States Patent
Zhodzishsky et al.

(10) Patent No.: US 10,203,417 B2
(45) Date of Patent: Feb. 12, 2019

(54) METHODS AND APPARATUS FOR ESTIMATING MOTION PARAMETERS OF GNSS RECEIVER

(71) Applicant: Topcon Positioning Systems, Inc., Livermore, CA (US)

(72) Inventors: Mark Isaakovich Zhodzishsky, Moscow (RU); Victor Andreevich Prasolov, Moscow (RU); Dmitry Markovich Zhodzishsky, Moscow (RU); Dmitry Pavlovich Nikitin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 405 days.

(21) Appl. No.: 15/101,623

(22) PCT Filed: Jan. 25, 2016

(86) PCT No.: PCT/RU2016/000023
§ 371 (c)(1),
(2) Date: Jun. 3, 2016

(87) PCT Pub. No.: WO2017/131548
PCT Pub. Date: Aug. 3, 2017

(65) Prior Publication Data
US 2018/0059256 A1 Mar. 1, 2018

(51) Int. Cl.
*G01S 19/43* (2010.01)
*G01S 19/29* (2010.01)
*G01S 19/52* (2010.01)
*G01S 19/49* (2010.01)
*G01S 19/54* (2010.01)
*G01S 5/02* (2010.01)

(52) U.S. Cl.
CPC .............. *G01S 19/43* (2013.01); *G01S 19/29* (2013.01); *G01S 19/52* (2013.01); *G01S 5/02* (2013.01); *G01S 19/49* (2013.01); *G01S 19/54* (2013.01)

(58) Field of Classification Search
CPC ................. G01S 19/43; G01S 19/29
See application file for complete search history.

(56) References Cited

U.S. PATENT DOCUMENTS 6,664,923 B1 * 12/2003 Ford .................. G01S 19/44
342/357.59
7,212,155 B2 * 5/2007 Hatch .................. G01S 19/43
342/357.26

(Continued)

FOREIGN PATENT DOCUMENTS

WO 2009006350 A1 1/2009

OTHER PUBLICATIONS

Search Report in PCT/RU2016/000023, dated Oct. 21, 2016.

*Primary Examiner* — Gregory C. Issing
(74) *Attorney, Agent, or Firm* — Bardmesser Law Group

(57) ABSTRACT

A method and a receiver apparatus allows obtaining accurate estimates of motion parameters of a mobile receiver, including smoothed estimates of total coordinates increments relative to its initial position, projections of velocity vector and acceleration vector. High estimation accuracy is achieved by filtering the biased or unbiased estimates of total coordinate increments relative to the receiver's initial position using smoothing tracking filters of a 2-nd or 3-rd order.

10 Claims, 3 Drawing Sheets

(56) References Cited

U.S. PATENT DOCUMENTS

| 7,439,908 B1* | 10/2008 | Zhodzishsky | G01S 19/43 |
| | | | 342/357.24 |
| 7,522,099 B2* | 4/2009 | Zhodzishsky | G01C 21/00 |
| | | | 342/357.24 |
| 2013/0222181 A1 | 8/2013 | Singh et al. | |
| 2015/0054680 A1 | 2/2015 | Lennel | |

\* cited by examiner

METHODS AND APPARATUS FOR ESTIMATING MOTION PARAMETERS OF GNSS RECEIVER

BACKGROUND OF THE INVENTION

Receivers of satellite signals of Global Navigation Satellite Systems (GNSS) (such as GPS, GLONASS, Galileo, etc.) are capable of determining motion parameters of a receiver based on measuring Doppler offsets of carrier frequency for each satellite. There are known methods of measuring Doppler offsets of carrier frequency.

U.S. Pat. No. 7,222,035 B1, entitled "Method and apparatus for determining changing signal frequency", discloses a method and apparatus for estimating the changing frequency of a signal. The system includes a PLL that tracks the changing signal frequency and outputs non-smoothed frequency estimates into a filter of frequency estimates (FFE). The FFE then smoothes noise in the signal to produce a more accurate smoothed frequency estimate of the input signal.

U.S. Pat. No. 9,020,088 B2, entitled "Digital system and method of estimating quasi-harmonic signal non-energy parameters using a digital Phase Locked Loop", discloses a digital system and method of measuring (estimating) non-energy parameters of the signal (phase, frequency and frequency rate). The system consists includes a PLL system tracking variable signal frequency, a block of NCO full phase computation (OFPC), a block of signal phase primary estimation (SPPE) and a first type adaptive filter filtering the signal from the output of SPPE. Another embodiment of the invention has no block SPPE, and NCO full phase is fed to the input of a second type adaptive filter.

U.S. Pat. No. 8,891,687 B1, entitled "Digital system and method of estimating non-energy parameters of signal carrier", discloses a digital navigation satellite receivers having a large number of channels, where phase discriminators and loop filters of a PLL operate in phase, with data bits and control of numerically controlled oscillator (NCO) carried out simultaneously on all channels. Since symbol boundaries for different satellites do not match, there is a variable time delay between the generation of control signals and NCO control time. This delay may be measured by counting a number of samples in the delay interval. The proposed system measures non-energy parameters of the BPSK signal carrier received in additive mixture with noise, when a digital loop filter of PLL controls NCO with a constant or changing time delay.

U.S. Pat. No. 7,522,099 B2, entitled "Position determination using carrier phase measurements of satellite signals", discloses a method and apparatus for determining the relative position of a mobile unit that moves from an initial location to a plurality of successive locations. The mobile unit receives signals from a plurality of navigation satellites and tracks the carrier phases of the signals during movement. For each of the received signals, carrier phase increments are calculated over a plurality of epochs. Anomalous carrier phase increments are determined and eliminated from further calculations. The non-eliminated carrier phase increments are then used to calculate coordinate increments for each of the time epochs. If, after elimination, the remaining number of carrier-phase increments is less than a threshold for a particular epoch, then coordinate increments for the particular epoch may be extrapolated using data from prior epochs. In various embodiments, least squares method and Kalman filtering may be used to calculate the coordinate increments. The coordinate increments may then be summed over a plurality of time epochs in order to determine a position of the receiver relative to its initial position.

U.S. Pat. No. 7,439,908 B1, entitled "Method and apparatus for determining smoothed code coordinates of a mobile rover", discloses a method for determining coordinates of a mobile rover. The method includes determining a vector of one-shot code coordinates of the mobile rover. The method also includes determining a vector of phase increments by determining full phase differences for each navigation satellite in a plurality of navigation satellites in view at a discrete time interval (called a time epoch) and at a previous time epoch in a plurality of time epochs. A vector of radial range increments is determined from the full phase differences. A vector of rover phase coordinate increments is also determined using the vector of radial range increments. The vector of one-shot code coordinates and the vector of rover phase coordinate increments are then filtered to determine, at each time epoch, smoothed code coordinates of the mobile rover. Measured phase increments are cleared up from abnormal measurements.

U.S. Pat. No. 8,818,720 B2, entitled "Method and apparatus of GNSS receiver heading determination", discloses a method and apparatus of determining a heading of a GNSS receiver. The receivers are capable of determining both coordinates and velocity of their spatial movement. When a receiver is used in any machine control systems a velocity vector heading should be determined along with velocity vector's absolute value. An angle determining velocity vector orientation is calculated based on velocity vector projections, which are computed in navigation receivers. The accuracy of velocity vector orientation calculated based on velocity vector projections strongly depends on velocity vector's absolute value. To enhance the accuracy, a method of smoothing primary estimates of velocity vector orientation angles using a modified Kalman filter has been proposed.

U.S. Pat. No. 7,222,035 B1, U.S. Pat. No. 9,020,088 B2 and U.S. Pat. No. 8,891,687 B1 measure the radial Doppler frequency of carrier for each satellite and do not evaluate parameters of movement of the rover in Cartesian coordinates.

In U.S. Pat. No. 7,522,099 B2 and U.S. Pat. No. 7,439,908 B1 for each of the received signals, carrier phase increments are calculated over a plurality of epochs. The carrier phase increments are then used to calculate coordinate increments for each of the time epochs. The coordinate increments may be then summed over a plurality of time epochs in order to determine a position of the receiver relative to its initial position.

U.S. Pat. No. 8,818,720 B2 discloses a method which includes a determination of velocity vector projections as a result of processing radio signals from GNSS satellites and generates a primary estimate of an absolute value of a velocity vector using current estimates of velocity vector projections; where pre-smoothed estimates of velocity vector projections may be used. To determine an orientation angle of the velocity vector, primary estimates of the velocity vector orientation angle and primary estimates of the velocity vector's absolute value are generated using velocity vector projections, and then these primary estimates are smoothed by a modified Kalman filter.

SUMMARY OF THE INVENTION

Accordingly, the present invention is directed to a system and method for estimating motion parameters of a GNSS receiver that substantially obviates one or more of the disadvantages of the related art.

Disclosed is methods and apparatus for accurate estimating of full increments of coordinate (FIC) relative to its initial position and the motion parameters of a GNSS moveable receiver—projections of velocity vector and acceleration vector. This is achieved by smoothing closed-loop tracking filters (CLTF) of the 2nd or 3rd order, the inputs of which are powered by unsmoothed FIC, obtained by a conversion on the basis of the ordinary least squares (OLS) method of full carrier phase estimates for each satellite caused by receiver moving and fluctuations of a reference oscillator.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the embodiments of the present invention, examples of which are illustrated in the accompanying drawings.

Unlike the conventional methods discussed above, the present invention enables obtaining accurate estimates of motion parameters of a moveable receiver—smoothed estimates of full increments of coordinates (FIC) relative to its initial position, projections of velocity vector and acceleration vector. High accuracy of the estimate is achieved by converting the full phase of carrier (FPC) for each satellite into the unsmoothed estimates of total coordinate increments, which are then smoothed by closed-loop tracking filters (CLTF) of the 2nd or 3rd order, which produce a smoothed estimation of the receiver's motion parameters.

The present invention can be used in receivers of various satellite navigation systems, such as GPS, GLONASS and GALILEO, which provide precise measurements of motion parameters of a moveable receiver.

Figure 1:
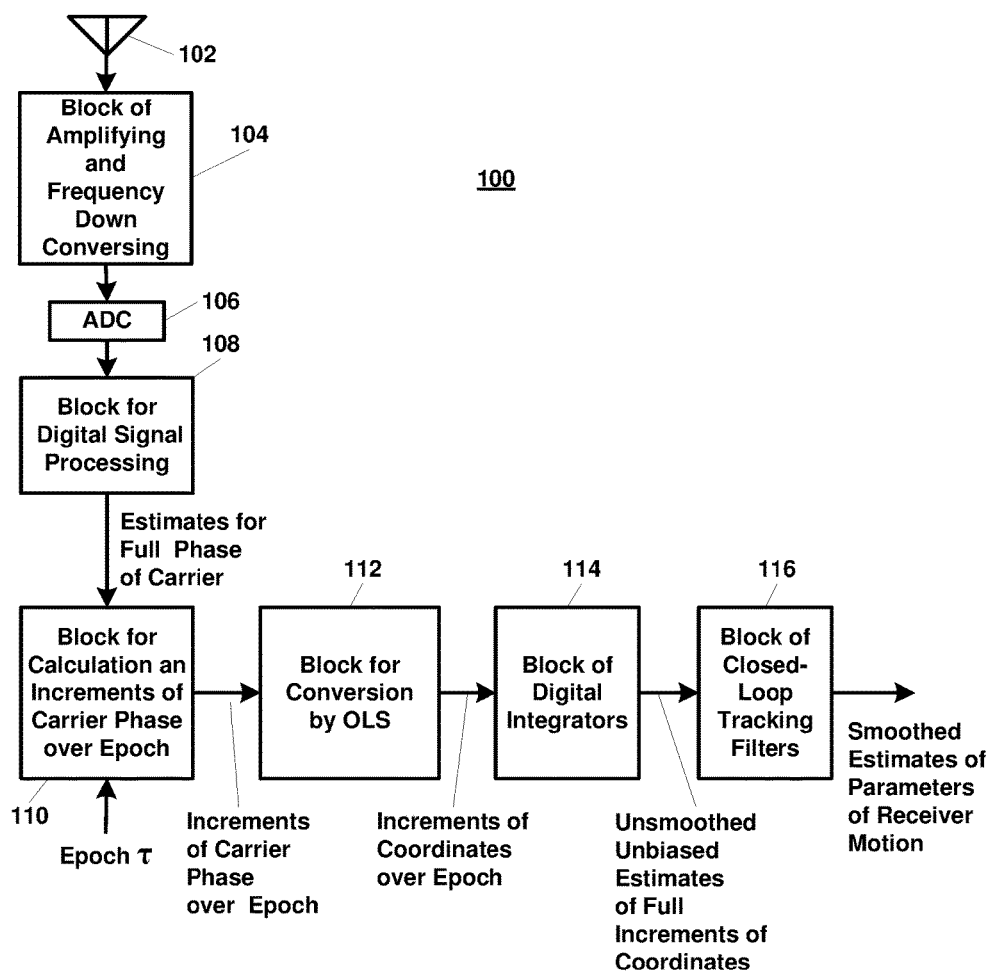
FIG. 1 illustrates a high level block diagram of a GNSS receiver apparatus with the invention embodiments that uses a first method.

FIG. 1 is a high level block diagram of a GNSS receiver apparatus (100) with the invention embodiments using a first method.

The receiver apparatus 100 includes:
an antenna 102 for receiving signals of N GNSS satellites;
a block 104 for amplifying and frequency down-converting the GNSS signals;
a block 106 for analog-to-digital conversion;
a block 108 for digital signal processing that implements, in particular, the algorithms of:
a) searching, acquiring and tracking GNSS satellites signals;
b) synchronizing carrier phase and code phase;
c) determining coordinates of a receiver;
d) estimating full phase of carrier (FPC) $\varphi_i^j$ for each satellite j caused only by receiver moving and fluctuations of a reference oscillator;

a block 110 for calculating an increments of carrier phase $\Delta_i^{\varphi,\tau,j} = \varphi_i^j - \varphi_{i-1}^j$ over a given time interval $\tau$ (epoch); these increments correspond to the moments of time $t_i = i \cdot \tau$ (i=1, 2, . . . ).

a block 112 for conversion an N-dimensional vector of measured the increments of carrier phase $\Delta_i^{\varphi,\tau,j}$ into to the 4-dimensional state vector $\Delta_i^\tau = (\Delta_i^{x,\tau}; \Delta_i^{y,\tau}; \Delta_i^{z,\tau}; \Delta_i^{q,\tau})$, where $\Delta_i^{x,\tau}, \Delta_i^{y,\tau}, \Delta_i^{z,\tau}$ are the increments of coordinates over the given epoch $\tau$ in a coordinate system, for example, the geocentric coordinate system x, y, z; the fourth component $\Delta_i^{q,\tau}$ of the state vector is a magnitude of a timescale offset over epoch $\Delta_i^{t,\tau} = \Delta_i^{1,\tau}/c$ (here c is the speed of light) of receiver clock relative to the time based on the navigation system. The conversion of the N-dimensional vector $\Delta_i^{\varphi,\tau,j}$ to a state vector $\Delta_i^\tau$ is performed by the ordinary least squares (OLS) method (see, for example, U.S. Pat. No. 7,439,908 B1, incorporated herein by reference):

$$\Delta_i^\tau = G_i \cdot \Delta_i^{\varphi,\tau,j} \qquad (1)$$

where $$G_i = [H_m^T W_i H_m]^{-1} H_m^T W_i \qquad (2)$$

here $H_m$ is the matrix of directional cosines supplemented by a unit column, and $W_i$ is the weight matrix, for example, the diagonal matrix with the diagonal elements equal to signal to noise ratio (SNR) for each satellite. Matrices $G_i$ and $W_i$ are updated every epoch $\tau$ (based on the rate of navigation tasks, for example, 10, 20, 40 or 100 times per second, but matrix $H_m$ can be updated less often, for example, once per second. The increments of coordinates $\Delta_i^{x,\tau}, \Delta_i^{y,\tau}, \Delta_i^{z,\tau}$ over the given epoch $\tau$ are caused only by receiver movement and do not depend on fluctuations of a reference oscillator.

a block 114 of four digital integrators that count unsmoothed unbiased estimates of total coordinates increments $\Delta_i^x, \Delta_i^y \Delta_i^z$ and timescale offset $\Delta_i^q$ over the entire observation time are calculated:

$$\Delta_i^x = \Delta_{i-1}^x + \Delta_i^{x,\tau} \text{ or } \Delta_i^x = \sum_{m=1}^{m=i} \Delta_m^{x,\tau}, \qquad (3)$$

$$\Delta_i^y = \Delta_{i-1}^y + \Delta_i^{y,\tau} \text{ or } \Delta_i^y = \sum_{m=1}^{m=i} \Delta_m^{y,\tau}, \qquad (4)$$

$$\Delta_i^z = \Delta_{i-1}^z + \Delta_i^{z,\tau} \text{ or } \Delta_i^z = \sum_{m=1}^{m=i} \Delta_m^{z,\tau}, \qquad (5)$$

$$\Delta_i^q = \Delta_{i-1}^q + \Delta_i^{q,\tau} \text{ or } \Delta_i^q = \sum_{m=1}^{m=i} \Delta_m^{q,\tau}; \qquad (6)$$

where $\Delta_0^x = \Delta_0^y = \Delta_0^z = 0$; where a timescale offset $\Delta_i^t$ of receiver clock relative to the time based on the navigation system over the whole observation time is equal to $\Delta_i^t = \Delta_i^q/c$;

a block 116 of three closed-loop tracking filters (CLTF), the inputs of which receive the corresponding unsmoothed unbiased estimates of the full increments of coordinates (FIC) $\Delta_i^x, \Delta_i^y, \Delta_i^z$ for the entire observation time. The 3-rd order CLTF produces smoothed estimates of total increments of coordinates $\hat{\Delta}_i^x, \hat{\Delta}_i^y, \hat{\Delta}_i^z$, speed $\dot{\hat{\Delta}}_i^x, \dot{\hat{\Delta}}_i^y, \dot{\hat{\Delta}}_i^z$ and acceleration $\ddot{\hat{\Delta}}_i^x, \ddot{\hat{\Delta}}_i^y, \ddot{\hat{\Delta}}_i^z$ and may be implemented, for example, by the following equations for smoothing of input $\Delta_i^x$ (and analogously for $\Delta_i^y, \Delta_i^z$):

$$\overline{\Delta}_i^x = \hat{\Delta}_{i-1}^x + \hat{\dot{\Delta}}_{i-1}^x \cdot \tau + \frac{1}{2}\hat{\ddot{\Delta}}_{i-1}^x \cdot \tau^2$$
$$\overline{\dot{\Delta}}_i^x = \hat{\dot{\Delta}}_{i-1}^x + \hat{\ddot{\Delta}}_{i-1}^x \cdot \tau \qquad (7)$$
$$\overline{\ddot{\Delta}}_i^x = \hat{\ddot{\Delta}}_i^x$$

$$z_i^x = \Delta_i^x - \overline{\Delta}_i^x; \qquad (8)$$

$$\hat{\Delta}_i^x = \overline{\Delta}_i^x + \alpha^x \cdot z_i^x$$
$$\hat{\dot{\Delta}}_i^x = \overline{\dot{\Delta}}_i^x + \beta^x \cdot z_i^x / \tau \qquad (9)$$
$$\hat{\ddot{\Delta}}_i^x = \overline{\ddot{\Delta}}_i^x + \gamma^x \cdot z_i^x / \tau^2$$

where $\alpha^x, \beta^x, \gamma^x$ are the transfer coefficients defined, for example, by the following equations:

$$\alpha^x = (3(k^x)^2 - 3k^x + 2)/D^x$$
$$\beta^x = (12k^x - 6)/D^x \qquad (10)$$
$$\gamma^x = 20/D^x$$

where $$D^x = k^x[(k^x)^2 + 3k^x + 2]/3. \qquad (11)$$

here $k^x \geq 3$ and may be constant. But a CLTF may be adaptive filter with variable transfer coefficients and hence with variable bandwidth. In this case, the block 116 comprises adaptation unit that modifies the coefficient $k^x$ from $k_{min}^x$ to $k_{max}^i$ according to, for example, the following equations:

$$k_i^x = k_{i-1}^x + 1, \qquad (12)$$

if $(k_i^x > k_{max}^x)$ then $k_i^x = k_{max}^x$; (13)

where, at $k_i^x = k_{max}^x$, the filters have the narrowest bandwidth; where transfer coefficients $\alpha_i^x, \beta_i^x, \gamma_i^x$ determined for each moment i by the equations (10) and (11) for $k^x = k_i^x$. To reduce the dynamic error due to maneuvers of a rover, the adaptation unit can expand the filter bandwidth, if the value of the tracking error $z_i^x$ exceeds a preset threshold $T_z$:

if $|z_i^x| > T_z$ then $k_i^x = k_{i-1}^x/r$, where $r > 1$. (14)

if $k_i^x < k_{min}^x$ then $k_i^x = k_{min}^x$. (15)

The threshold value $T_z$ is set equal to 3-5 standard deviations of the tracking error $z_i^x$ in the absence of receiver movement.

The 2-nd order CLTF produces smoothed estimates of speed and total increments of coordinates and may be implemented, for example, by the following equations (these equations are obtained from the equations for the 3-rd order CLTF at $\gamma^x = 0$) for smoothing of input $\Delta_i^x$ (and analogously for $\Delta_i^y / \Delta_i^z$) the expressions become:

$$\overline{\Delta}_i^x = \hat{\Delta}_{i-1}^x + \hat{\dot{\Delta}}_{i-1}^x \cdot \tau \qquad (16)$$
$$\overline{\dot{\Delta}}_i^x = \hat{\dot{\Delta}}_{i-1}^x$$

$$z_i^x = \Delta_i^x - \overline{\Delta}_i^x; \qquad (17)$$

$$\hat{\Delta}_i^x = \overline{\Delta}_i^x + \alpha^x \cdot z_i^x$$
$$\hat{\dot{\Delta}}_i^x = \overline{\dot{\Delta}}_i^x + \beta^x \cdot z_i^x / \tau \qquad (18)$$

where transfer coefficients $\alpha^x, \beta^x$ are equal, for example, to:

$$\alpha^x = \frac{2(2k^x - 1)}{k^x(k^x + 1)}$$
$$\beta^x = \frac{6}{k^x(k^x + 1)} \qquad (19)$$

The 2-nd order CLTF may also be adaptive and comprise an adaptation unit, operating, for example, in accordance with the formulas (12)-(15).

Figure 2:
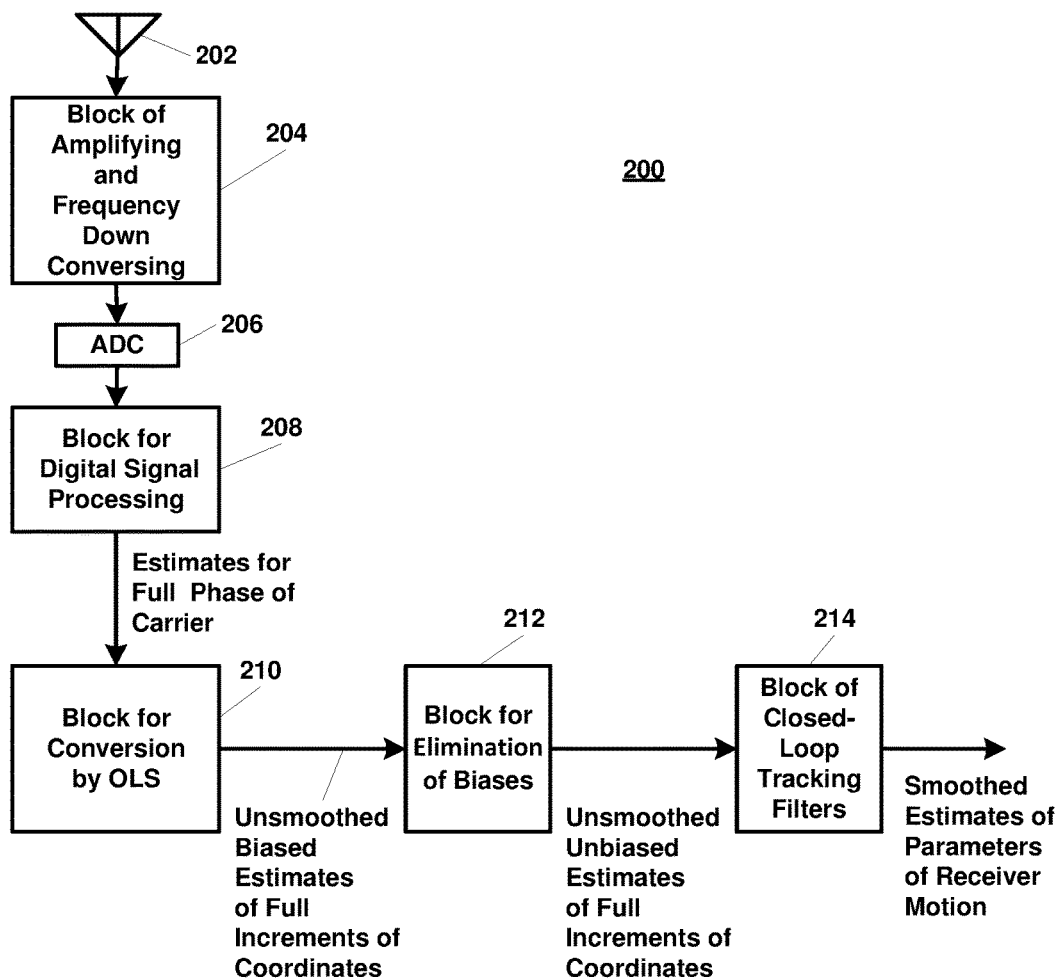
FIG. 2 illustrates a high level block diagram of a GNSS receiver apparatus with the invention embodiments using a second method.

FIG. 2 illustrates a high level block diagram of a GNSS receiver apparatus with the invention embodiments using a second method. The apparatus includes blocks 202-208 that perform the same role as blocks 102-108 in apparatus on FIG. 1;

a block 210 for conversion by OLS of full phase of carrier (FPC) $\varphi_i^j$ to unsmoothed biased estimates of full increments of coordinates $\Delta_i^{*x}, \Delta_i^{*y}, \Delta_i^{*z}$ and timescale offset $\Delta_i^{*q}$ over all observation time;

a block 212 for elimination of biases based, for example, on the following equations:

$$\Delta_i^x = \Delta_i^{*x} - \Delta_0^{*x}$$
$$\Delta_i^y = \Delta_i^{*y} - \Delta_0^{*y}$$
$$\Delta_i^z = \Delta_i^{*z} - \Delta_0^{*z} \qquad (20)$$
$$\Delta_i^q = \Delta_i^{*q} - \Delta_0^{*q}$$

here i=1, 2, 3, . . . ;

a block 214 of three closed-loop tracking filters (CLTF), the inputs of which receive the corresponding unsmoothed unbiased estimates of the full increments of coordinates (FIC) $\Delta_i^x, \Delta_i^y, \Delta_i^z$ for all observation time. The block 214 may be implemented as the block 116 in the apparatus on FIG. 1.

Figure 3:
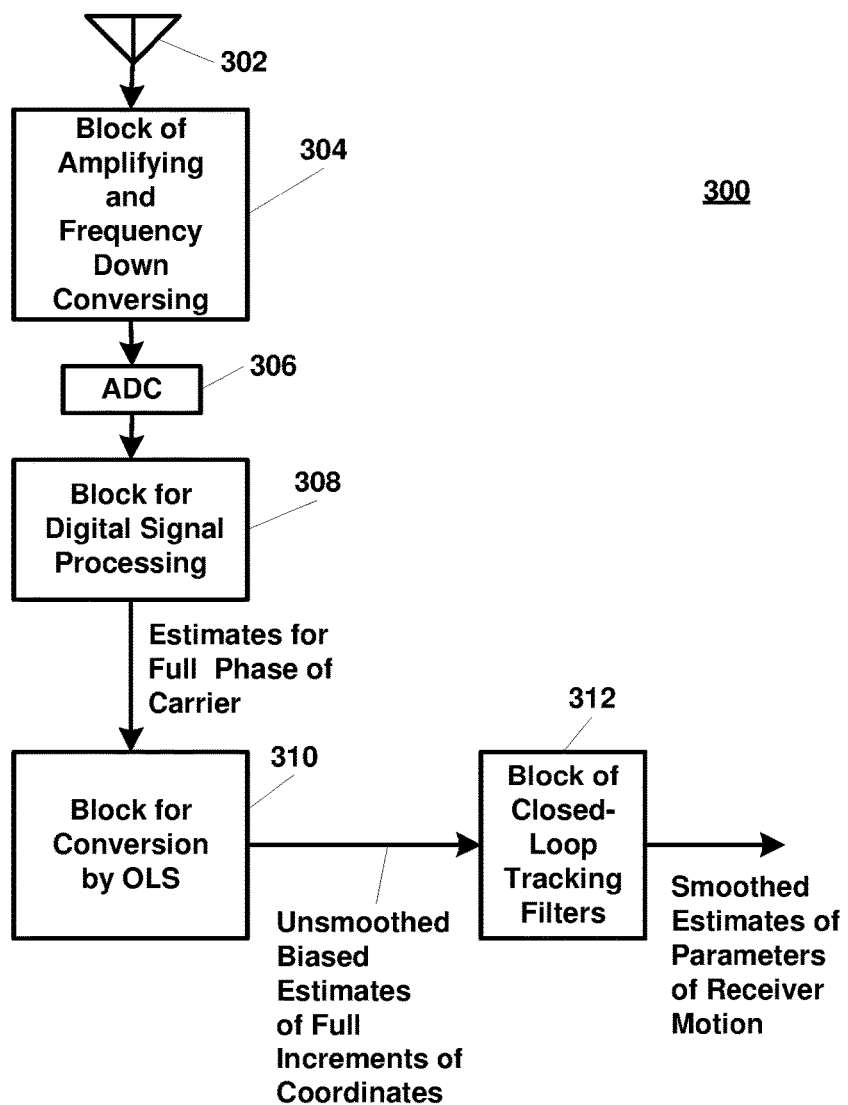
FIG. 3 illustrates a high level block diagram of a GNSS receiver apparatus with the invention embodiments using a third method.

FIG. 3 illustrates a high level block diagram of a GNSS receiver apparatus with the invention embodiments by third method. The apparatus 300 differs from apparatus 200 in that it lacks a block for elimination of biases of full increments of coordinates (FIC), and the input of CLTF block 312 feeds unsmoothed biased estimates of FIC. So this method can be used only to obtain estimates of speed and acceleration of receiver, or to obtain speed only.

Having thus described the different embodiments of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of estimating motion parameters of a GNSS (global navigation satellite system) receiver, the method comprising:
   a) receiving GNSS signals via an antenna;
   b) amplifying and frequency down-converting the GNSS signals;
   c) converting the GNSS signals from analog to digital signals;
   d) processing the digital signals, including calculating a position of the receiver and calculating a full phase of carrier (FPC) for each satellite caused only by the receiver motion relative to each satellite and a fluctuation of a reference oscillator;

e) calculating increments of the FPC for each satellite over an epoch;

f) converting by ordinary least squares the increments of the FPC over the epoch into increments of coordinates over the epoch;

g) calculating unsmoothed unbiased estimates of the increments of coordinates relative to an initial position of a receiver by integrating the increments of coordinates over the epoch; and h) filtering the unsmoothed unbiased estimates of the increments of coordinates by closed-loop tracking filters (CLTF) to generate smoothed estimates of parameters of receiver motion, including smoothed estimates of the increments of coordinates.

2. The method of claim 1, wherein the filtering the unsmoothed estimates of the increments of coordinates is performed by a linear CLTF with constant parameters.

3. The method of claim 1, wherein the filtering the unsmoothed estimates of the increments of coordinates is performed by a CLTF of a 2nd order, including generating estimates of velocity and smoothed estimates of the increments of coordinates.

4. The method of claim 1, wherein the filtering the unsmoothed estimates of the increments of coordinates is performed by a CLTF of a 3rd order, including generating estimates of acceleration, velocity and smoothed estimates of the increments of coordinates.

5. The method of claim 1, wherein the filtering of the unsmoothed estimates of the increments of coordinates is performed by an adaptive CLTF with variable parameters that depend on tracking errors, and wherein a bandwidth of the adaptive CLTF varies between maximum and minimum values, and the bandwidth is reduced if the tracking error does not exceed a preset threshold, and otherwise the bandwidth increases.

6. A GNSS (global navigation satellite system) receiver, comprising:

a) an antenna for receiving GNSS signals;

b) a block for amplifying and frequency down-converting the GNSS signals;

c) a block for converting the GNSS signals from analog to digital signals;

d) a block for processing the digital signals, including calculating a position of the receiver and calculating full phases of carrier (FPC) for each satellite caused only by the receiver motion relative to each satellite and a fluctuation of a reference oscillator;

e) a block for calculating increments of FPC for each satellite over an epoch;

f) a block for converting by ordinary least squares the increments of FPC for each satellite over the epoch into increments of coordinates over the epoch;

g) a block of digital integrators for calculating unsmoothed unbiased estimates of full increments of coordinates (FIC) relative to an initial position of the GNSS receiver, wherein the block of digital integrators receives the increments of coordinates over the epoch; and h) a block for filtering the unsmoothed unbiased estimates of the FIC by closed-loop tracking filters (CLTF) to generate smoothed estimates of parameters of receiver motion, including smoothed estimates of the FIC.

7. The GNSS receiver of claim 6, wherein the block for filtering the unsmoothed estimates of the FIC includes a linear CLTF with constant parameters.

8. The GNSS receiver of claim 6, wherein the block for filtering the unsmoothed estimates of the FIC includes a CLTF of a 2nd order, generating estimates of velocity and smoothed estimates of the FIC.

9. The GNSS receiver of claim 6, wherein the block for filtering the unsmoothed estimates of the FIC includes a CLTF of a 3rd order, generating estimates of acceleration, velocity and smoothed estimates of the FIC.

10. The GNSS receiver of claim 6, wherein the block for filtering the unsmoothed estimates of the FIC uses an adaptive CLTF with variable parameters that depend on tracking errors, and wherein a bandwidth of the adaptive CLTF varies between a maximum and minimum values, and the bandwidth is reduced if the tracking error does not exceed a preset threshold, and otherwise the bandwidth increases.

* * * * *